United States Patent
Kubo (10) Patent No.: US 7,336,308 B2
(45) Date of Patent: Feb. 26, 2008

(54) DIGITAL CAMERA WITH SENSITIVITY COMPENSATION

(75) Inventor: Naoki Kubo, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 1079 days.

(21) Appl. No.: 10/374,047

(22) Filed: Feb. 27, 2003

(65) Prior Publication Data
US 2003/0169357 A1 Sep. 11, 2003

(30) Foreign Application Priority Data
Mar. 6, 2002 (JP) .............................. 2002-060664

(51) Int. Cl.
*H04N 5/335* (2006.01)
*H04N 5/235* (2006.01)
(52) U.S. Cl. .................... 348/296; 348/229.1; 348/277
(58) Field of Classification Search ................ 348/296, 348/229.1, 277
See application file for complete search history.

(56) References Cited

U.S. PATENT DOCUMENTS

| | | | | |
|---|---|---|---|---|
| 4,935,808 A | * | 6/1990 | Hashimoto | ................... 348/283 |
| 5,049,983 A | * | 9/1991 | Matsumoto et al. | ......... 348/273 |
| 5,631,701 A | * | 5/1997 | Miyake | .................... 348/222.1 |
| 5,648,817 A | * | 7/1997 | Aoki et al. | .................. 348/264 |
| 5,659,359 A | | 8/1997 | Mochizuki et al. | |
| 5,781,314 A | * | 7/1998 | Mochizuki | ................... 358/474 |
| 6,249,317 B1 | * | 6/2001 | Hashimoto et al. | ......... 348/364 |
| 6,415,102 B1 | * | 7/2002 | Fujii et al. | ................... 386/117 |
| 6,473,125 B1 | * | 10/2002 | Kuno | .......................... 348/296 |
| 7,053,949 B2 | * | 5/2006 | Hwang | ....................... 348/312 |
| 2001/0030694 A1 | * | 10/2001 | Abe | .............................. 348/223 |
| 2002/0018246 A1 | * | 2/2002 | Misawa | ...................... 358/474 |

FOREIGN PATENT DOCUMENTS

| | | | | |
|---|---|---|---|---|
| JP | 06-133226 A | | 5/1994 | |
| JP | 9-46714 | | 2/1997 | |
| JP | 11-055579 | * | 2/1999 | .................... 5/335 |
| JP | 2000-224600 | | 8/2000 | |

* cited by examiner

*Primary Examiner*—Lin Ye
*Assistant Examiner*—Hung Lam
(74) *Attorney, Agent, or Firm*—Birch, Stewart, Kolasch & Birch, LLP (57) ABSTRACT

Voltage signals outputted from a CCD are subjected to correlated double sampling processing by a correlated double sampling circuit (CDS), after which digital gain processing is carried out at a gain control amplifier (GCA). A gain difference between G color signals and R/B color signals outputted from the CCD is caused by a difference between a G exposure duration $t_G$ and an R/B exposure duration $t_{R/B}$. When the value of a ratio between the $t_G$ and the $t_{R/B}$ falls below a predetermined value, the GCA applies digital gain for compensating for the gain difference by multiplying respective signal values of R, G and B by gain correction coefficients as follows: (gain compensation coefficient $\alpha$)=(G exposure duration $t_G$)/(R/B exposure duration $t_{R/B}$)=(G exposure duration $t_G$)/((G exposure duration $t_G$)+ (exposure duration difference $\Delta t$)).

14 Claims, 6 Drawing Sheets

DIGITAL CAMERA WITH SENSITIVITY COMPENSATION

BACKGROUND OF THE INVENTION

1. Field of the Invention

The present invention relates to a digital camera, and particularly to a digital camera equipped at least with a high-speed electronic shutter.

2. Description of the Related Art

In recent years, digital cameras which take still pictures or moving pictures of image subjects by utilizing a solid state imaging system, whose structure includes a solid-state imaging element such as a CCD (charge coupled device) sensor or the like for photographing a subject, have become common.

"Interline transfer-type CCD sensors" (referred to simply as "CCD sensors" below) are often employed in such digital cameras. An interline transfer-type CCD sensor is provided with photodiode (PD) sections, a plurality of vertical transfer registers, a horizontal transfer register, transfer gates (TG), and an overflow drain (OFD). The PD sections serve as solid-state imaging elements, which are, for example, rectangularly disposed at respective pixels, and which photoelectrically convert received light into electronic signals. The vertical transfer registers read out and transfer charges that have accumulated at the PD sections. The transfer gates are for transferring charges from the PD sections to the vertical transfer registers. The horizontal transfer register transfers charges that have been transferred from the vertical transfer registers. The overflow drain is for discharging unneeded charges that remain at the PD sections.

At the time of an operation for receiving light in accordance with a subject image, this CCD sensor operates the OFD for achieving an electronic shutter function, completely flushes charge remaining at the PD sections, and then closes the TGs and enters a state in which charge accumulation is possible (a light-reception capable state). In this light-reception capable state, light in accordance with the subject image is received for a predetermined exposure duration (a charge accumulation duration), and charges are accumulated at the PD sections. Then, at the time of a charge transfer operation, which transfers and outputs the charges accumulated at the pixels by the light-receiving operation, the TGs are opened and the charges accumulated at the PD sections are transferred to the vertical transfer registers. The charges transferred to the vertical transfer registers are serially transferred to the horizontal transfer register, and then outputted from the horizontal transfer register. Thus, the charges accumulated at the respective PD sections are read out.

For a method for reading out the accumulated charges at this time, a field accumulation method and a frame accumulation method are commonly utilized.

The frame accumulation method is a method in which a single frame is divided into two fields (an odd field and an even field). Charges accumulated at light-receiving elements of odd lines, which are in the odd field, and charges accumulated at light-receiving elements of even lines, which are in the even field, are transferred and read out alternatingly. In this method, at a field shift time for the odd field, the charges accumulated at pixels of the odd lines are transferred line-by-line in the vertical direction at the vertical transfer registers, and then line shifting is carried out and the accumulated charges of the pixels of the odd lines are serially read out from an output terminal. In the meantime, accumulation of charges is being carried out at the pixels of the even lines. Thereafter, the charges accumulated at the pixels of the even lines in the even field are transferred to the vertical transfer registers, line shifting is carried out, and the charges accumulated at the pixels of the even lines are serially read out from the output terminal.

In contrast, the field accumulation method is a method which reads out by, for an odd field, melding and transferring charges accumulated at pixels of a line that is an odd number from a horizontal transfer register side and of a next even-numbered line and, for an even field, melding and transferring charges accumulated at pixels of a line that is an even number from the horizontal transfer register side and a next odd-numbered line.

That is, in the frame accumulation method, accumulated charges are always read out for only half of all pixels in each field, but in the field accumulation method, reading out is performed for charges accumulated at all pixels in both fields.

When charges are read out by the field accumulation method, in order to suitably control potentials of the element main body, two kinds of transfer gate pulse, which have different occurrence timings, are required for the two fields. In contrast, when charges are read out by the frame accumulation method, only one type of transfer gate pulse is needed.

In these interline-type CCD sensors, in a case in which a shutter speed of the electronic shutter is fast, a difference between exposure times of the odd field and the even field occurs at the time of reading out the accumulated charges, which leads to image deterioration, such as the occurrence of flicker and the like.

In order to deal with this problem, a technique has been proposed in, for example, Japanese Patent Application Laid-Open No. 6-133226. In this technique, exposure times of the fields are made equal by adjusting output timings of shutter pulses for the electronic shutter.

However, in an all-pixel-readout type CCD, such as a honeycomb CCD proposed by the applicant of the present invention, it is difficult to apply the prior art technique mentioned above so as to provide a structure in which the electronic shutter resets the charges in all photo diodes (PD) at the same time.

Figure 6:
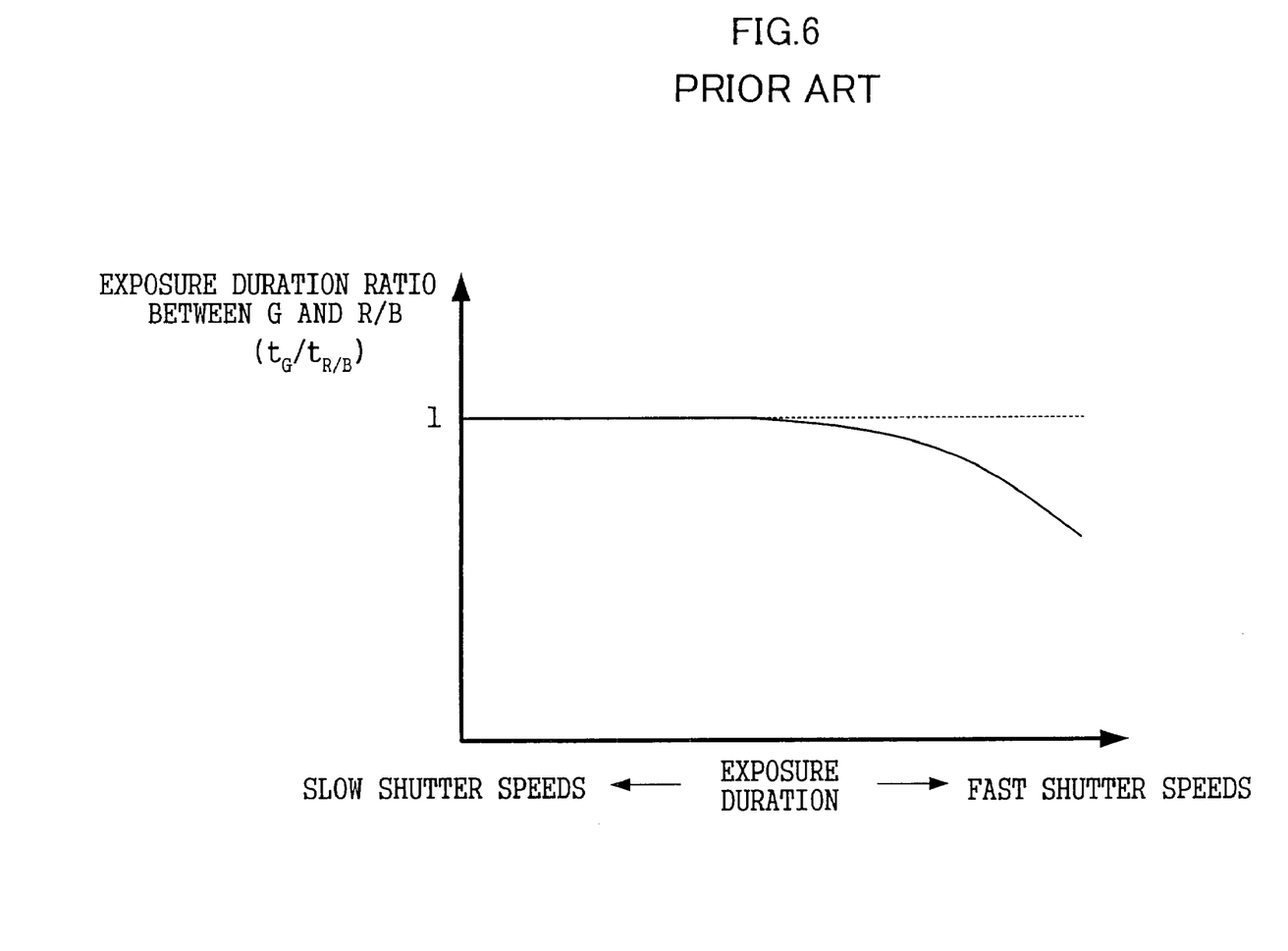
FIG. 6 is a diagram for explaining a relationship in the prior art between a ratio of an exposure duration G to exposure durations of R and B and exposure duration lengths for each color.

Moreover, with the aforementioned honeycomb CCD, or a conventional interline-type CCD in which the light-receiving elements are rectangularly disposed, in processing for reading out moving images, readout timings (timings for transfer of the charges from the PDs to the vertical transfer registers) are different for different colors. Consequently, particularly when using an electronic shutter with a high shutter speed (for example, 1/10,000 second, 1/100,000 second, or the like), differences in exposure times lead to gain errors. Consequently, obvious color shifting may occur, and image deterioration may result (see FIG. 6).

SUMMARY OF THE INVENTION

The present invention is intended to solve the problem described above, and an object of the present invention is to provide a digital camera which is capable of appropriately compensating for sensitivity errors that occur dependently of shutter speed, and which has excellent sensitivity characteristics.

A first aspect of the present invention is a digital camera including: solid state imaging elements which receive light in accordance with a subject image, and accumulate charge in accordance with the received light; a shutter pulse output section which outputs a first shutter pulse and a second shutter pulse at mutually different times; an imaging control section which controls such that photosensed colors of all pixels of the solid state imaging elements are divided between at least two regions, one region being based on a first color and another region being based on a second color, and such that accumulated charges of pixels corresponding to the first color are read out on the basis of edge timing of the first shutter pulse and accumulated charges of pixels corresponding to the second color are read out on the basis of edge timing of the second shutter pulse; and a compensation section which performs gain compensation on the basis of a value of a ratio between charge accumulation durations of the region based on the first color and the region based on the second color, such that gains for the respective color regions are mutually equal.

According to the first aspect to the present invention, sensitivity correction can be carried out suitably in accordance with the shutter speed (i.e., in accordance with exposure differences). The compensation section may be structured to be included in, for example, a white balance adjustment section, which is often provided in conventional digital cameras, or the compensation section may be structured to be included in a function which is separate from and prior to such a white balance adjustment section.

A second aspect of the present invention is the invention of the first aspect in which, when the value of the ratio between the charge accumulation durations of the region based on the first color and the region based on the second color is less than or equal to a predetermined value, the compensation section performs the compensation using a compensation coefficient which is determined in advance on the basis of a difference between the charge accumulation durations of the region based on the first color and the region based on the second color.

According to the second aspect of the present invention, the sensitivity correction can be carried out effectively and appropriately.

A third aspect of the present invention is the invention of the first or second aspect, further including a mechanical shutter section which physically shields light irradiating toward a light-receiving surface of the solid state imaging elements, wherein the gain compensation by the compensation section is not implemented when the mechanical shutter is operated.

According to the third aspect of the present invention, the correction is not carried out when the mechanical shutter is used, and when the electronic shutter is used, the sensitivity correction is carried out. Thus, the gain compensation can be implemented effectively.

DESCRIPTION OF THE PREFERRED EMBODIMENTS

Herebelow, an embodiment of the present invention is described in detail with reference to the drawings.

Figure 1:
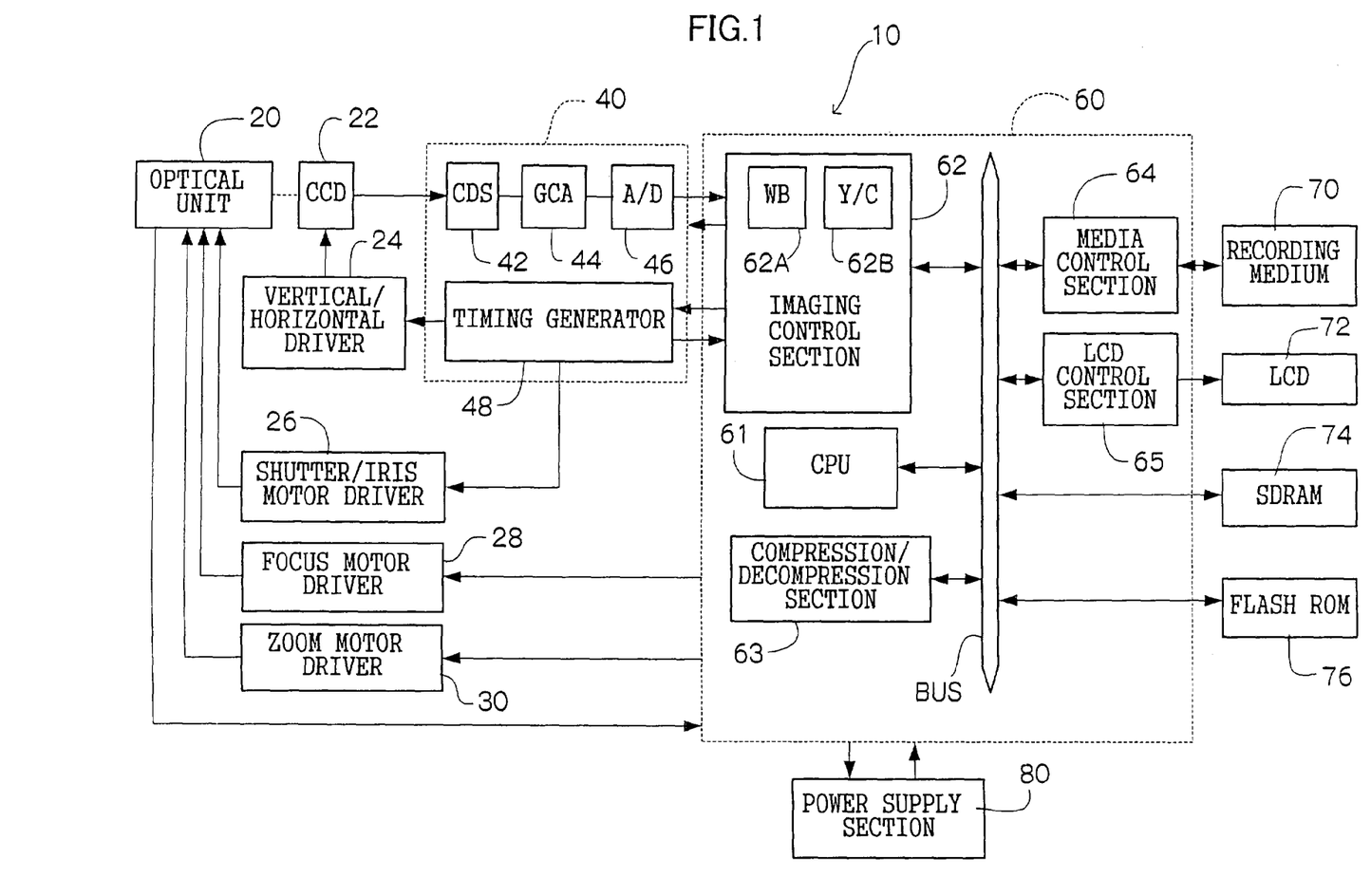
FIG. 1 is a schematic structural diagram of a digital camera relating to an embodiment of the present invention.

FIG. 1 shows a schematic structural diagram of a digital camera 10 relating to the present embodiment. The digital camera 10 has a structure which includes an optical unit 20, a CCD 22, a signal-processing section 40, a main control section 60, a vertical/horizontal driver 24, a shutter/iris motor driver 26, a focus motor driver 28, and a zoom motor driver 30. The optical unit 20 has a structure including a lens for focusing a subject image. The CCD 22 is disposed at a rear side of the lens, on an optical axis thereof. The signal-processing section 40 creates digital image data which represents the subject image on the basis of output signals from the CCD 22, and generates timing signals for driving each section of the optical unit 20, the CCD 22 and the like. The main control section 60 administers overall operations of the digital camera 10. The vertical/horizontal driver 24 drives the CCD 22. The shutter/iris motor driver 26 drives shutter and aperture mechanisms which are included at the optical unit 20. The focus motor driver 28 drives a focus point adjustment motor which is included at the optical unit 20. The zoom motor driver 30 drives a zoom motor which is included at the optical unit 20.

The signal-processing section 40 and the main control section 60 are structured as a single LSI (large scale integrated circuit) chip. Accordingly, a reduction in size, an increase in reliability, and a reduction of costs can be expected.

The structure of the digital camera 10 further includes a liquid crystal display (LCD) 72, an SDRAM (synchronous dynamic RAM) 74, a flash ROM 76, an image display section 78, and a power supply section 80. The LCD 72 displays subject images obtained by imaging by the CCD 22, various kinds of information, and the like. The SDRAM 74 principally stores digital image data obtained by imaging by the CCD 22. The flash ROM 76 stores various parameters, programs and the like. The image display section 78 displays images obtained by imaging at the CCD 22, various kinds of information, and the like. The power supply section 80 provides electrical power to the main control section 60.

The structure of the signal-processing section 40 includes a correlated double sampling (CDS) circuit 42, a gain control amplifier (GCA) 44, an A/D converter 46, and a timing generator 48.

The main control section 60 is structured with a bus connecting between a CPU (a central arithmetic processing device) 61, an imaging control section 62, a compression/decompression section 63, a media control section 64, an LCD control section 65 and a video encoder 66. The CPU 61 administers operations of the whole of the main control section 60. The imaging control section 62 is structured to include a built-in line buffer having a predetermined capacity, a white balance adjustment circuit (WB) 62A and a Y/C conversion circuit (Y/C) 62B. The WB circuit 62A adjusts variations of white balance. The Y/C circuit 62B converts RGB data to Y/C signals. The compression/decompression section 63 performs compression processing on digital image data to a predetermined compression format (for example, the JPEG (Joint Photographic Experts Group) format or the like), and performs decompression processing on digital image data that has been compression-processed.

A removable recording medium 70, such as a SMART MEDIA, an IC card, a CD-R, a CD-RW or the like, is connected to the media control section 64. Writing of various kinds of information to the recording medium 70 and reading of the various kinds of information that have been written to the recording medium 70 are controlled by the media control section 64. The LCD 72 is connected to the LCD control section 65, and various kinds of information are displayed at the LCD 72 under the control of the LCD control section 65. The LCD 72 can be utilized as a viewfinder which displays a moving image obtained by continuous imaging (a through-image).

The SDRAM 74 and the flash ROM 76 are connected to the bus of the main control section 60. Accordingly, the CPU 61 can freely access various kinds of data stored at the SDRAM 74 and the flash ROM 76.

An output terminal of the CCD 22 is connected sequentially via the CDS circuit 42, the GCA circuit 44 and the A/D converter 46 to the imaging control section 62. That is, correlated double sampling is implemented for signals outputted from the CCD 22 by the CDS circuit 42, and sensitivity compensation (which is described in more detail below) is implemented for each of R (red), G (green), and B (blue) at the CCD 22 by the GCA circuit 44. Thereafter, the signals are applied to the A/D converter 46 as R, G and B signals for each pixel. The A/D converter 46 converts the R, G and B signals, which are applied serially from the GCA circuit 44, to digital signals of respectively predetermined bit values (below referred to as "digital image data"), and outputs this digital image data to the imaging control section 62.

Digital image data that is serially inputted from the A/D converter 46 to the line buffer built-in at the imaging control section 62 is accumulated and temporarily stored at the SDRAM 74.

The digital image data stored in the SDRAM 74 is read out to the WB circuit 62A under the control of the CPU 61, and white balance adjustment is carried out on this data by applying digital gain in accordance with the type of a light source. In addition, gamma processing and sharpness processing are carried out. Thus, the predetermined digital image data is generated. Further, YC signal processing is performed at the Y/C circuit 62B, such that brightness signals Y and chroma signals Cr and Cb (below referred to as "YC signals") are generated. The YC signals are stored back in the SDRAM 74.

When the LCD 72 is being used as a viewfinder, the generated YC signals are sequentially outputted to the LCD control section 65, and a through-image is displayed at the LCD 72.

When an unillustrated shutter button is operated by pressing by a camera operator, the YC signals stored at the SDRAM 74 are compressed in a predetermined compression format by the compression/decompression section 63, and then stored at the recording medium 70 via the media control section 64.

The timing generator 48 is connected with the vertical/horizontal driver 24, the shutter/iris motor driver 26 and the imaging control section 62. The timing generator 48 outputs timing signals for driving the CCD 22 to the vertical/horizontal driver 24, timing signals for driving the mechanical shutter and aperture mechanism provided at the optical unit 20 to the shutter/iris motor driver 26, and timing signals for driving the imaging control section 62 to the imaging control section 62.

Input terminals of the focus motor driver 28 and the zoom motor driver 30 are respectively connected to the main control section 60 (more specifically, to the CPU 61). An output terminal of the focus motor driver 28 is connected to the focus point adjustment motor provided at the optical unit 20, and an output terminal of the zoom motor driver 30 is connected to the zoom motor provided at the optical unit 20.

The lens included in the optical unit 20 relating to the present embodiment includes a plurality of individual lenses, is structured as a zoom lens which is capable of changing focusing distance (or magnification), and is provided with an unillustrated lens-driving mechanism. This lens-driving mechanism includes the zoom motor and the focus point adjustment motor. The zoom motor and the focus point adjustment motor are driven by driving signals provided from the zoom motor driver 30 and the focus motor driver 28, respectively, under the control of the CPU 61.

When an optical zoom magnification is to be changed, the CPU 61 controls to drive the zoom motor, and changes the focusing distance of the lens included in the optical unit 20.

The CPU 61 also carries out focusing control by controlling to drive the focus point adjustment motor so as to maximize contrast of an image obtained by imaging by the CCD 22. That is, the digital camera 10 relating to the present embodiment is structured such that the "TTL" (through the lens) method, in which the position of the lens is set so as to maximize contrast of the captured image, is employed for focus control. Thus, focusing control is performed automatically when the shutter button (not shown) is half-pressed in a state in which the subject is positioned at a photographing position indicated by an autofocus frame.

Figure 2:
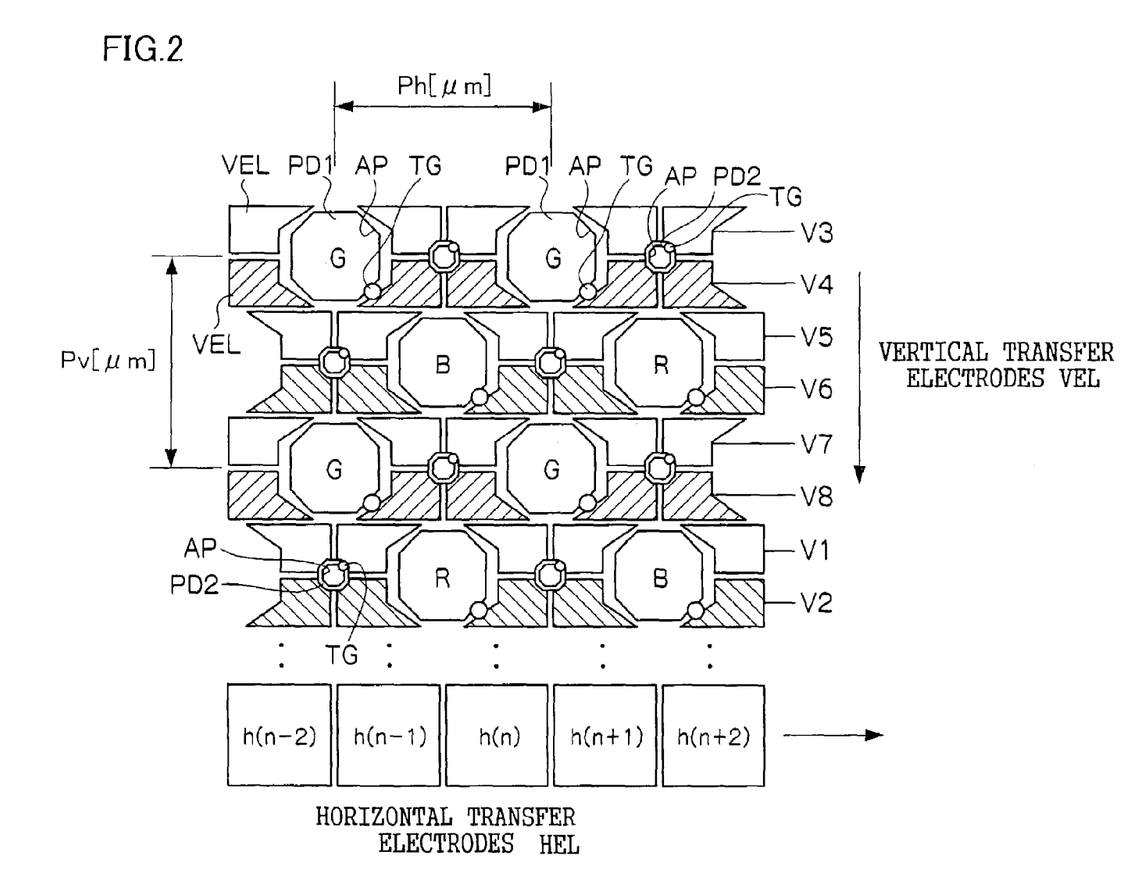
FIG. 2 is a schematic structural diagram concerning part of a CCD imaging section relating to the embodiment of the present invention.

As shown in FIG. 2, a honeycomb CCD, which has been proposed by the applicant of the present invention, can be employed at the CCD 22.

As shown in FIG. 2, an imaging section of the CCD 22 is provided with a plurality of light-receiving elements PD, vertical transfer electrodes VEL, and horizontal transfer electrodes HEL. The light-receiving elements PD are allocated one to each of one-color pixels, and are two-dimensionally arrayed at predetermined arrangement pitches (a horizontal arrangement pitch is Ph (measured in $\mu m$), and a vertical arrangement pitch is Pv (measured in $\mu m$)), with neighboring light-receiving elements PD being offset in the vertical and horizontal directions relative to one another. The vertical transfer electrodes VEL are disposed so as to pass around aperture portions AP which are formed at front faces of the light-receiving elements PD. The vertical transfer electrodes VEL extract signals (charges) from the light-receiving elements PD, and transfer these signals in the vertical direction. The horizontal transfer electrodes HEL are disposed at a vertical direction lower side of the vertical transfer electrodes VEL that are located bottommost in the vertical direction. The horizontal transfer electrodes HEL transfer signals from the vertical transfer electrodes VEL to an exterior portion. In the example shown in FIG. 2, the aperture portions AP are formed in honeycomb-form octagonal shapes.

Any one of vertical transfer driving signals V1, V2, . . . V8 can be applied simultaneously to a vertical transfer electrode group, which group is structured by a plurality of the vertical transfer electrodes VEL that is arranged along a straight line in the horizontal direction. In the example shown in FIG. 2, the vertical transfer driving signal V3 can be applied to a first vertical transfer electrode group, the vertical transfer driving signal V4 can be applied to a second vertical transfer electrode group, the vertical transfer driving signal V5 can be applied to a third vertical transfer electrode group, the vertical transfer driving signal V6 can be applied to a fourth vertical transfer electrode group, the vertical transfer driving signal V7 can be applied to a fifth vertical transfer electrode group, the vertical transfer driving signal V8 can be applied to a sixth vertical transfer electrode group, the vertical transfer driving signal V1 can be applied to a seventh vertical transfer electrode group, and the vertical transfer driving signal V2 can be applied to an eighth vertical transfer electrode group.

Each light-receiving element PD is electrically connected to a neighboring one of the vertical transfer electrodes VEL via a transfer gate TG. In the structure of the example shown in FIG. 2, each light-receiving element PD is connected via the transfer gate to the vertical transfer electrode VEL that is adjacent to the bottom right of that light-receiving element PD.

As shown in FIG. 2, in the imaging section of this CCD 22, a region vertically adjacent to one of the light-receiving element region has a four-electrode structure, and a region horizontally adjacent to one of the light-receiving element region has a two-electrode structure.

In FIG. 2, the aperture portions AP formed at the front faces of the receiving elements PD at which 'R' is written are covered with color separation filters which transmit red light, the aperture portions AP formed at the front faces of the receiving elements PD at which 'G' is written are covered with color separation filters which transmit green light, and the aperture portions AP formed at the front faces of the receiving elements PD at which 'B' is written are covered with color separation filters which transmit blue light. In other words, the light-receiving elements PD at which 'R' is written receive red light, the light-receiving elements PD at which 'G' is written receive green light, and the light-receiving elements PD at which 'B' is written receive blue light.

Below, an operation for extracting signals from the light-receiving elements PD at a time of imaging by the CCD 22 is described.

First, a predetermined high voltage is applied to the vertical transfer electrode groups that include the vertical transfer electrodes VEL that are connected to the light-receiving elements PD via the transfer gates TG (i.e., to the vertical transfer electrodes VEL that are marked with diagonal lines in FIG. 2), and a predetermined low voltage, which is lower than the high voltage, is applied to the vertical transfer electrode groups that are sandwiched by the vertical transfer electrode groups specified above (i.e., to the vertical transfer electrodes VEL that are whited-out in FIG. 2). That is, the vertical transfer driving signals V2, V4, V6 and V8 are set to the high voltage, and the vertical transfer driving signals V1, V3, V5 and V7 are set to the low voltage. When this is done, potential wells are formed at lower portions of the vertical transfer electrodes VEL that are connected to the light-receiving elements PD via the transfer gates TG. Thus, charges that have accumulated at the light-receiving elements PD, which are connected to these vertical transfer electrodes VEL, all at once flow into these potential wells.

Next, an intermediate voltage, which is lower than the high voltage and higher than the low voltage, is applied to the vertical transfer electrode groups that are adjacent at vertical direction lower sides to the vertical transfer electrode groups that include the vertical transfer electrodes VEL that are connected to the light-receiving elements PD via the transfer gates TG. In other words, the vertical transfer driving signals V1, V3, V5 and V7 are set to the intermediate voltage. When this happens, potential wells are formed at lower portions of the vertical transfer electrodes VEL to which the intermediate transfer voltage is applied, and the charges flow into these potential wells from the potential wells at the lower portions of the vertical transfer electrodes VEL that are connected to the light-receiving elements PD via the transfer gates TG.

Next, the voltage applied to the vertical transfer electrode groups that include the vertical transfer electrodes VEL that are connected to the light-receiving elements PD via the transfer gates TG is set to the low voltage. That is, the vertical transfer driving signals V2, V4, V6 and V8 are set to the low voltage. As a result, the whole of the charges accumulated at the lower portions of the vertical transfer electrodes VEL that are connected to the light-receiving elements PD via the transfer gates TG move to the potential wells that are formed at the lower portions of the vertical transfer electrodes VEL that are adjacent at the vertical direction lower side of the vertical transfer electrodes VEL connected to the light-receiving elements PD.

Thereafter, the charges that had been accumulated at the light-receiving elements PD are transferred sequentially to adjacent vertical transfer electrodes VEL in the vertical direction, in a "relay fashion", by repeating the operation described above. Hence, the charges can be read out as a single field at the horizontal transfer electrodes HEL. Thus, this CCD 22 has a structure capable of combinedly utilizing the field accumulation method and the frame accumulation method for reading out charges.

Hereafter, operation of the present embodiment is described.

Figure 3:
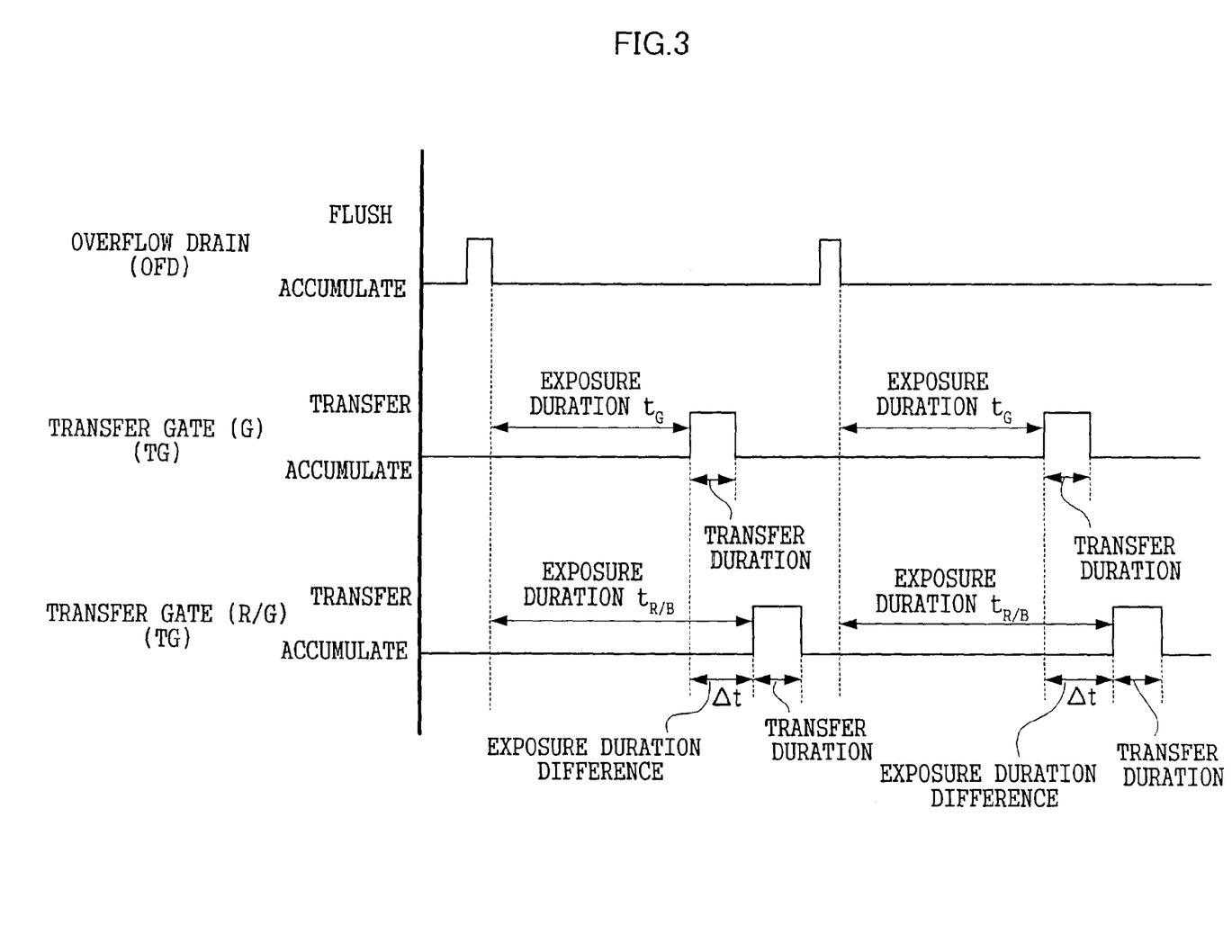
FIG. 3 is a timing chart which shows aspects of respective control signals for light-receiving elements of the CCD imaging section relating to the embodiment of the present invention.

First, the digital camera 10, which has been in a shooting standby state, is operated by a user to take a picture of a subject image. Hence, image light of the subject is focused through the optical unit 20 onto a light-receiving surface of the CCD 22, and the CCD 22 converts the image light focused at the light-receiving surface into signal charges of magnitudes corresponding to the light amounts of the focused image light. The signal charges accumulated in this manner are read out to the shift registers in accordance with transfer gate pulses, which are applied from the timing generator 48 via the vertical/horizontal driver 24, and are serially read out in the form of voltage signals corresponding to the signal charges in accordance with register transfer pulses. As shown in FIG. 3, the CCD 22 can flush out the signal charges with an OFD pulse. Hence, the CCD 22 controls exposure durations, that is, charge accumulation durations (shutter speed). Thus, the CCD 22 has a so-called "electronic shutter" function.

Correlated double sampling processing is performed by the CDS circuit 42 on the voltage signals outputted from the CCD 22, and then digital gain processing is implemented by the GCA circuit 44.

At the GCA circuit 44, a gain difference between G color signals and R and B color signals outputted from the CCD 22, which is caused by a difference between a G exposure duration $t^G$ and an R and B exposure duration $t_{R/B}$, as shown in FIG. 3, is compensated for as follows.

Figure 4:
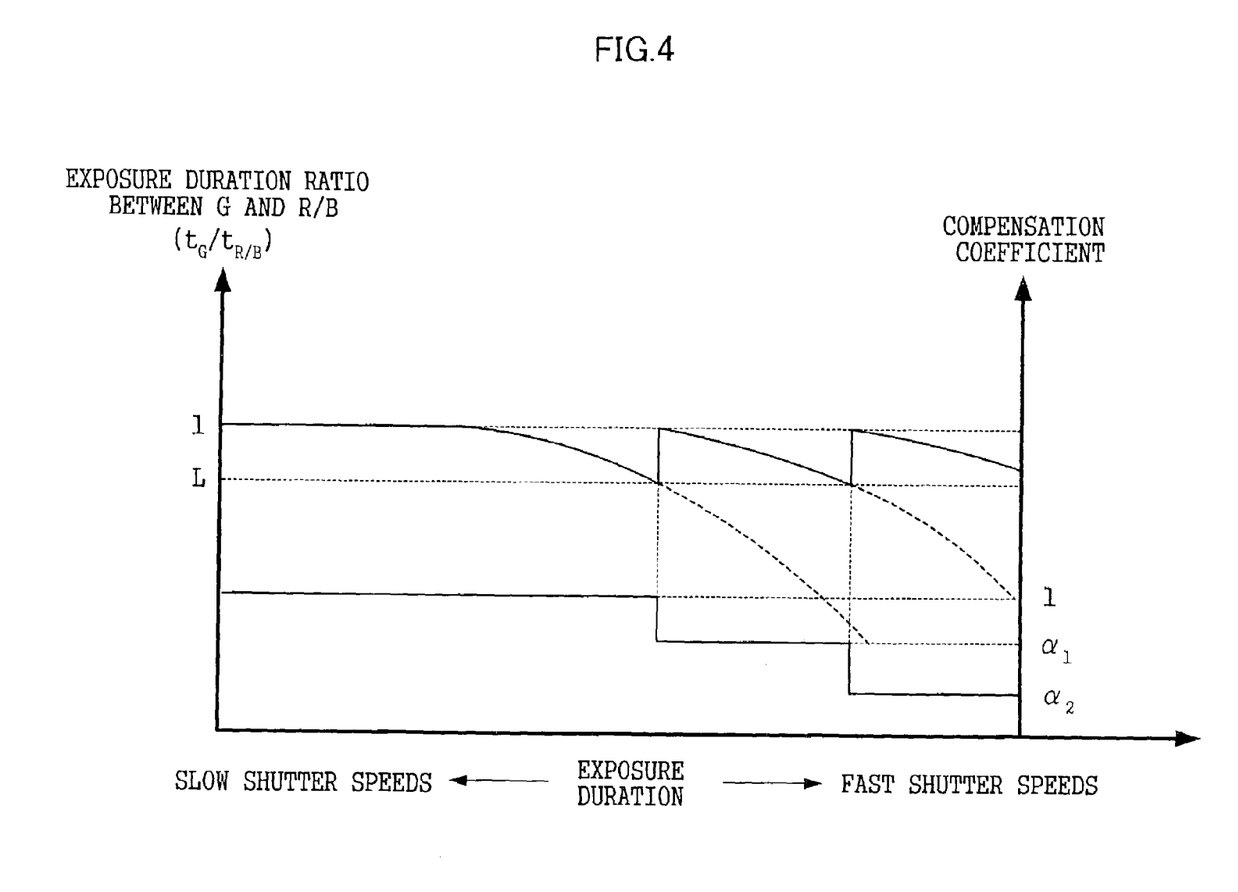
FIG. 4 is a diagram for explaining a relationship in the present embodiment between a ratio of an exposure duration G to exposure durations of R and B and exposure duration lengths for each color.

As shown in FIG. 4, if the value of a ratio of the G exposure duration to the R/B exposure duration is less than or equal to a predetermined value L, then digital gain is applied by multiplying the R, G and B signal values by gain compensation coefficients as shown below.

(gain compensation coefficient α)=(exposure duration for G, $t_G$)/(exposure duration for R/B, $t_{R/B}$) =(exposure duration for G, $t_G$)/((exposure duration for G, $t_G$)+(exposure duration difference Δt))

The color signals that have been compensated at the GCA circuit 44 are analog-to-digital converted at the A/D converter 46, and then outputted to the imaging control section 62. First, at the WB circuit 62A, white balance adjustment is performed for each of the R, G and B signals. Therein, digital gain is applied using compensation coefficients that have been determined in advance ($A_R$, $A_G$, and $A_B$).

Specifically, for the G signal:

(WB-compensated value of G)=(value of G signal)×(WB compensation coefficient $A_G$)

and for the R and B signals:

(WB-compensated value of R or B)=(value of R or B signal)×(WB compensation coefficient $A_R$ or $A_B$).

The gain compensation carried out at the GCA circuit 44 may be carried out at the WB circuit 62A. In such a case, specifically, in the case of the G signals:

(gain-compensated value of G)=(value of G signal)×(WB compensation coefficient $A_G$)×(gain compensation coefficient 1)

and in the case of the R and B signals:

(gain-compensated value of R or B)=(value of R signal or B signal)×(WB compensation coefficient $A_R$ or $A_B$)×(gain compensation coefficient α).

Further, the color signals for which white balance adjustment has been performed are converted to brightness signals Y and chroma signals Cr and Cb (YC signals) at the Y/C circuit 62B. These signals (data) are stored at the SDRAM 74.

The YC signals that have been stored at the SDRAM 74 as described above are compressed in a predetermined format by the compression/decompression section 63, and then recorded onto the recording medium 70 via the media control section 64.

Figure 5:
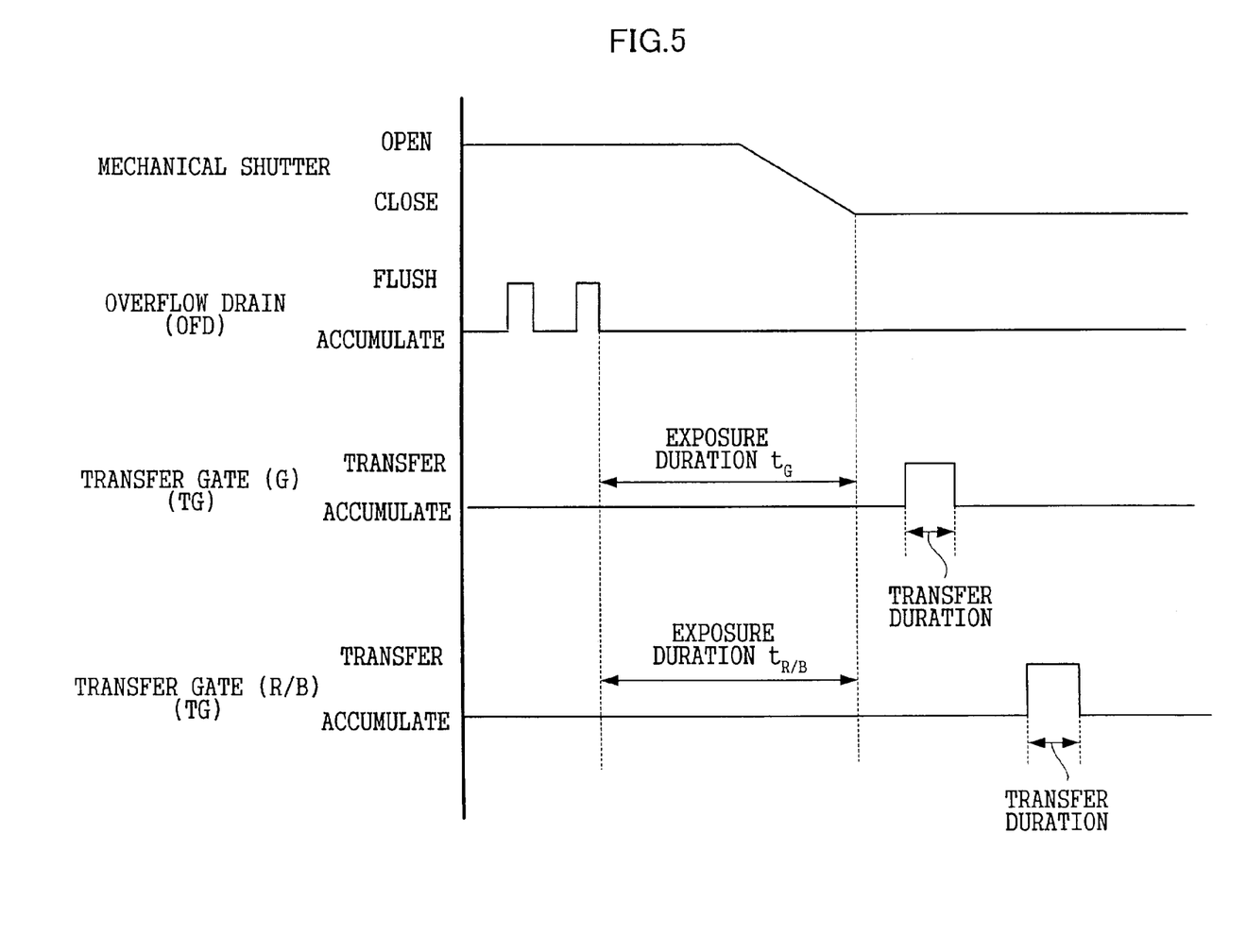
FIG. 5 is a timing chart which shows aspects of respective control signals for light-receiving elements of the CCD imaging section when a mechanical shutter is used.

As shown in FIG. 5, when the mechanical shutter is utilized, the exposure durations $t_G$ and $t_{R/B}$ of the light-receiving elements PD corresponding to each color are always equal. Consequently, the gain compensation need not be implemented, and sensitivity can be efficiently compensated by only carrying out gain compensation when the electronic shutter is utilized.

As is explained above, according to the digital camera relating to the present embodiment, compensation to adjust gains of output signals from solid state imaging elements is carried out in accordance with a difference between exposure durations. Thus, compensation for sensitivity errors caused by the difference between exposure durations is possible. Moreover, because compensation values are calculated numerically from the difference between exposure durations, the gain compensation can be performed simply.

Further, if the gain compensation is performed by conventional white balance adjustment means, radically new elements need not be added (i.e., there is not a great increase in costs), and the present invention can be realized with currently available resources. Further, the present invention can be realized without affecting a complex white balance adjustment system, by performing the gain compensation in a function that is separately provided upstream from the conventional white balance adjustment means.

What is claimed is:

1. A digital camera comprising:
   solid state imaging elements which receive light in accordance with a subject image, and accumulate charge in accordance with the received light, the solid state imaging elements being divided into two regions, one region being covered by color-separation filters transmitting a green-color light and another region being covered by color-separation filters transmitting one of a red-color and a blue-color light;
   an electronic shutter;
   a shutter pulse output section which, after the electronic shutter resets charges in all of the solid state imaging elements at the same time, outputs a first shutter pulse and a second shutter pulse at mutually different times;
   an imaging control section which controls such that accumulated charges of solid state imaging elements corresponding to the green-color light are read out on the basis of edge timing of the first shutter pulse and accumulated charges of solid state imaging elements corresponding to the one of the red-color and the blue-color light are read out on the basis of edge timing of the second shutter pulse; and
   a compensation section which performs gain compensation on the basis of a value of a ratio between charge accumulation durations of the region covered by color-separation filters transmitting a green-color light and the region covered by color-separation filters transmitting one of a red-color and a blue-color light, such that gains for the respective regions are mutually equal.

2. The digital camera of claim 1, wherein, when the value of the ratio between the charge accumulation durations of the region covered by color-separation filters transmitting a green-color light and the region covered by color-separation filters transmitting one of a red-color and a blue-color light is less than or equal to a predetermined value, the compensation section performs the compensation using a compensation coefficient which is determined in advance on the basis of a difference between the charge accumulation durations of the region covered by color-separation filters transmitting a green-color light and the region covered by color-separation filters transmitting one of a red-color and a blue-color light.

3. The digital camera of claim 1, further comprising a mechanical shutter section which physically shields light irradiating toward a light-receiving surface of the solid state imaging elements, wherein the gain compensation by the compensation section is not implemented when the mechanical shutter is operated.

4. The digital camera of claim 2, further comprising a mechanical shutter section which physically shields light irradiating toward a light-receiving surface of the solid state imaging elements, wherein the gain compensation by the compensation section is not implemented when the mechanical shutter is operated.

5. A digital camera comprising:
   an optical unit which includes a lens for focusing a subject image, a shutter, an aperture mechanism, a focus point adjustment motor, and a zoom motor;
   a CCD (charge-coupled-device) where all pixels are divided into two regions, one region being covered by color-separation filters transmitting a green-color light and another region being covered by color-separation filters transmitting one of a red-color light and a blue-color light;

a signal-processing section which generates digital image data representing the subject image on the basis of output signals from the CCD, and which generates timing signals for driving the optical unit and the CCD;

an electronic shutter;

a shutter pulse output section that, after the electronic shutter resets charges in all the pixels of the CCD at the same time, outputs a first shutter pulse and a second shutter pulse at different times;

a main control section which controls overall operation of the digital camera;

a vertical/horizontal driver which drives the CCD;

a shutter/iris motor driver which drives the shutter and the aperture mechanism;

a focus motor driver which drives the focus point adjustment motor; and a zoom motor driver which drives the zoom motor, wherein accumulated charges of pixels of the CCD corresponding to the green-color light are read out on the basis of edge timing of the first shutter pulse and accumulated charges of pixels of the CCD corresponding to the one of the red-color and the blue-color light are read out on the basis of edge timing of the second shutter pulse, and the signal-processing section includes a compensation section which performs gain compensation on the basis of a value of a ratio between charge accumulation durations of the region covered by color-separation filters transmitting a green-color light and the region covered by color-separation filters transmitting one of a red-color and a blue-color light, such that gains for the respective regions are mutually equal.

6. The digital camera of claim 5, further comprising:
RAM for storing the digital image data;
ROM for storing parameters and programs;
an image display section which displays the subject image and information; and
a power supply section which supplies electrical power to the main control section.

7. The digital camera of claim 5, wherein the signal-processing section further comprises a correlated double sampling circuit, an A/D converter, and a timing generator.

8. The digital camera of claim 5, wherein the main control section comprises a bus which interconnects between:
a CPU which controls overall operation of the main control section;
a built-in line buffer with a predetermined capacity;
an imaging control section which includes a white balance adjustment circuit for adjusting changes of white balance and a Y/C conversion circuit for converting RGB data to YC signals;
a compression/decompression section which carries out compression processing to a predetermined compression format on the digital image data, and carries out decompression processing on digital image data that has been compression-processed;
a media control section;
an image display control section; and a video encoder.

9. The digital camera of claim 8, wherein a removable recording medium is connected to the media control section.

10. The digital camera of claim 8, wherein an image display section is connected to the image display control section.

11. The digital camera of claim 8, wherein an output terminal of the CCD is connected to the imaging control section via a correlated double sampling circuit, a gain control amplifier and an A/D converter, in that order.

12. The digital camera of claim 5, wherein an input terminal of the focus motor driver and an input terminal of the zoom motor driver are respectively connected to the main control section, an output terminal of the focus motor driver is connected to the focus point adjustment motor, and an output terminal of the zoom motor driver is connected to the zoom motor.

13. The digital camera of claim 1, wherein the solid state imaging elements are a honeycomb CCD.

14. The digital camera of claim 5, wherein the CCD is a honeycomb CCD.

* * * * *